United States Patent Office 3,469,071
Patented Sept. 23, 1969

3,469,071
WELDABLE PRIMER
Ralph L. Feldt, Manchester, John F. Montle, Creve Coeur, and Ernest W. Skiles, Crestwood, Mo., assignors to Carboline Company, St. Louis, Mo., a corporation of Delaware
No Drawing. Continuation-in-part of application Ser. No. 593,741, Nov. 14, 1966. This application Nov. 13, 1967, Ser. No. 682,556
Int. Cl. B23k 9/00; C23c 11/06
U.S. Cl. 219—137                                    10 Claims

ABSTRACT OF THE DISCLOSURE

A method of arc-welding steel having a protective coating includes the step of providing the steel with a coating which is suitable for an arc-welding operation yet resistant enough to keep the steel safe from corrosion. The preferred coatings which serve this dual function utilize partially hydrolyzed esters of oxygenated amphoteric metal binders, for example ethyl silicate, and powdered sacrificial metals such as zinc metal; other silicates and titanates may be employed. The sacrificial metal should be of a size and concentration to provide electrical contact throughout the film and with the steel so that it forms a protective galvanic cell. Accordingly, the steel is protected and can be machine arc-welded at standard welding speeds.

---

This application is a continuation-in-part of our application Ser. No. 593,741, filed Nov. 14, 1966.

This invention relates to weldable coatings, or primers, and, more particularly, to weldable primers suitable for application to ferrous metals such as steels which are subsequently to be machine welded.

It is well known that the best welds are secured with steel surfaces which are clean and free from the products of corrosion, millscale, rust or other foreign matter. Cleaning operations are, therefore, standard procedure where steel surfaces are to be machine welded but this does not avoid the problems resulting from weathering and subsequent corrosion of such steel prior to erection, because the cleaning operations do not provide a method for maintaining a clean rust free surface.

Various procedures have been used to protect steel from corrosion by weathering either before or after erection and among these procedures has been the application of coatings containing a sacrificial metal such as zinc. Various combinations of zinc with materials to hold it in place are provided and function efficiently to protect steel from corrosive environments. These sacrificial coatings, though somewhat effective in combating corrosion, have interfered with machine welding operations. Galvanizing is an effective means of combating corrosion. However, where the steel is galvanized, welds made through the zinc surface frequently develop cracks. Such interference has frequently been so serious that an acceptable weld is difficult or impossible to achieve. It is, therefore, standard practice to coat steel surfaces with a protective agent after rust, millscale and foreign material have been removed. Before erection or use, however, the protective coating must likewise be removed in the field or shop so that acceptable machine welds can be made. Although efforts have been carried out to devise coatings containing sacrificial metals such as zinc powder which are suitable for welding operation yet resistant enough to keep the steel safe from corrosion, they have been imperfect since they always represent a compromise between weldability and protection. With machine welding, however, such coatings are impossible to weld or require slow speeds in order to achieve a high-quality weld. Such slow speeds frequently render the semi-automatic and automatic machine welding techniques more expensive than hand welding techniques. Machine welding therefore has been ineffective where a weldable primer known to the art is utilized.

Thus, there is an extremely practical difference between the rates of manual, semi-automatic machine welding and automatic machine welding, et al., where machine welding rates obtainable are in excess of about 15 inches per minute, i.e. about 15–75 or more inches per minute, such as 20–60 inches per minute, but preferably in excess of 30 inches per minute, such as 30–40 inches per minute. Machine welding rates within the above ranges can be obtained with steels coated in accord with this invention.

The present invention provides an inorganic coating containing sacrificial metals as exemplified by zinc for steel surfaces which will protect the surface from corrosion but will not interfere with subsequent welding of the steel with welding machinery operating at standard welding speeds.

Among the objects of the present invention are the provision of weldable primers which effectively protect steel surfaces from corrosion by the application of a sacrificial metal; the provision of weldable primers of the class indicated which do not interfere with subsequent welding operations; and the provision of weldable primers which, when applied to steel surfaces, do not interfere with machine welding operations. Other objects and features will be in part apparent and in part pointed out hereinafter.

The invention accordingly comprises the methods hereinafter described, the scope of the invention being indicated in the following claims.

Theoretically, any sacrificial metal may be employed in the coating. A sacrificial metal is a metal which sacrifices itself to corrosion in place of the ferrous metal it protects, i.e. any metal or combination of metals which is oxidized more easily than iron. Stated another way, it is theoretically any metal higher than iron on the electromotive series so that it operates in conjunction with iron as a galvanic cell. Since, practically, the use of the specific sacrificial metal is determined by economics, developed techniques, presence of oxide film, rate of sacrifice, and availability, the preferred sacrificial metal is zinc. Other commonly available sacrificial metals, such as aluminum, magnesium, etc. may also be employed. In addition, mixtures as well as alloys of these and other sacrificial metals may also be employed.

The particle size of the sacrificial metal should be any size that can be easily dispersed in the inorganic binder. It should be of a sufficient concentration to provide particle to particle contact both throughout the coating and to the ferrous substrate. It should be of such size to permit spray application with standard commercial spray equipment. Stated another way, the coating so produced should have electrical contact both throughout the film and with the steel substrate so that a protective galvanic cell is formed.

Thus, theoretically any sacrificial metal dust of the proper size and concentration to afford protective electrical contact in the form of a galvanic cell can be employed.

In practice, the particle size of the sacrificial metal may range for example from about 1 to 20 microns, or greater, but is preferably at least 2 microns. One generally employs a particle size of from about 1 micron to 10 microns but preferably from about 3 microns to 8 microns.

Theoretically, the concentration of the sacrificial metal in the final coat should be sufficient to maintain electrical contact with other particles and the steel substrate. In practice, the sacrificial metal is a major part of the coating as finally deposited, excluding solvent or water, such as for example 50 to 98%, for example 75–95%, but preferably 80–90%.

The preferred type of inorganic coatings which can be employed in conjunction with sacrificial metals, such as zinc, are those formed by the partial hydrolysis of esters of oxygenated metals, particularly those metals of the amphoteric type. These are semi-permeable coatings allowing sufficient moisture to permeate through to form a galvanic cell. These are best illustrated by silicate esters, and more particularly orthosilicate esters, such as those of the formula Si(OR)$_4$ where R is an alcohol moiety, such as alkyl, and preferably lower alkyl, i.e. methyl, ethyl, propyl, butyl, amyl, etc. isomers of these alkyl groups, i.e. isopropyl, isobutyl, sec-butyl, etc., and most preferably ethyl. Equivalents of these compositions can also be employed such as alkyl polysilicates for example

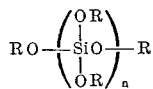

where $n$ is a whole number, for example 2, 3, 4, 5, etc. and various other precured polymeric derivatives of alkyl orthosilicates.

These coatings are illustrated by U.S. Patent 3,056,684 which patent is incorporated, by reference, into the present application.

Other inorganic coatings include the titanate esters, for example those of the formula Ti(OR)$_4$, where R is an alcohol moiety, such as alkyl, preferably lower alkyl, i.e. methyl, ethyl, propyl, butyl, amyl, isomers thereof such as isopropyl, isobutyl, sec-butyl, isoamyl, etc., and most preferably butyl.

Equivalents thereof can also be employed, for example polytitanates

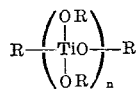

having approximately the same value for $n$, and various other precured polymeric derivatives of alkyl titanates.

In addition, appropriate mixtures of silicate and titanate esters can be employed to yield a coating having both silicate and titanate moieties.

In certain instances it may be desirable to employ certain additives, both organic and inorganic, in conjunction with the above esters, generally in minor amounts.

The preferred coatings utilize a partially hydrolyzed alkyl, for example, ethyl silicate binder and powdered sacrificial metal such as zinc metal. The binder polymerizes and further hydrolyzes upon contact with moisture in the air to form a tough, semi-permeable binder which holds the sacrificial metal in contact with the steel surface. The coating composition may also contain solvents, additional pigments and extenders and thixotropic agents or other additives which improve the coatings so secured.

The coating may be applied to the steel surface in any convenient way, such as spraying, dipping or brushing but is preferably sprayed on the clean steel surface. It dries rapidly and permits quick handling. It should be applied to give a film thickness in the range of 0.1 to 4.0 mils.

The following examples illustrate sacrificial protective coatings such as the type disclosed in U.S. Patent 3,056,684. The coating is applied to a clean steel surface to give a dry film thickness in the range of approximately 0.1 to 4.0 mils. When this is done, the steel surface is effectively protected from corrosion yet its weldability is not impaired. Such steel surfaces with the weldable primer of the present invention can be machine welded in the normal manner to form strong high-quality welds at relatively low cost and after erection or assembly the surface may be top coated with a permanent protective coating system. In this way the advantages and economies of machine welding can be secured and the surface protected prior to erection. The protective coating for the surface functions as a weldable primer when applied in accordance with the present invention. High-quality machine welds can be made without removing the protective coating and the structure formed may then be top coated with a permanent protective coating system.

EXAMPLE 1

An alkyl silicate-zinc coating mixture is prepared from:

Parts by wt.
Partially hydrolyzed ethyl silicate prepared in accordance with Patent No. 3,056,684 _____ 275
Inert silicate fillers _____ 25
Zinc powder _____ 200

EXAMPLE 2

Partially hydrolyzed ethyl silicate _____ 10
Zinc powder _____ 70

EXAMPLE 3

Partially hydrolyzed ethyl silicate _____ 30
Zinc powder _____ 30

EXAMPLE 4

Partially hydrolyzed ethyl silicate _____ 5
Zinc powder _____ 50

EXAMPLE 5

Partially hydrolyzed ethyl silicate _____ 5
Zinc powder _____ 20

EXAMPLE 6

Partially hydrolyzed ethyl silicate _____ 15
Zinc powder _____ 50

EXAMPLE 7

Partially hydrolyzed ethyl silicate _____ 20
Zinc powder _____ 60
Fibrous asbestos _____ 2

EXAMPLE 8

Clean pickled, non-blasted steel was coated with the coating mixture of Example 1 by spraying so that a coating of approximately 0.6 mil was secured on four plates and of approximately 2 mils on two. These plates were then welded to each other using an Airco Automatic Wire Feeder Welder operating at 117 volts, 9 amps, 60 cycle, single phase. The welding rods were Airco Flux Core No. 1 and Arc Alloy 78 (Chemetron Corporation, York, Pa.). The plates were fillet welded at a speed estimated at approximately 40 to 50 inches per minute. The current was 375 amps at 30 volts.

After welding, a visual examination was made by grinding the welds back and checking for "worm holes." The welded joint appeared excellent in each instance and equivalent to that which would have been secured had no primer been employed.

EXAMPLE 9

Example 8 was repeated except that a T-bar was welded at its foot to a steel plate utilizing (1) a Lincoln Mechanical Squirrel Welder or (2) an Esab Straddle Buggy double weld lead tip. A Lincoln L61 rod at 380 amp. and 30 volts was used in equipment (1). Equipment (2) employed a double tip with the lead tip at 300 amp. and 30 volts and the follow tip at 325 amp. and 30 volts. The five plates and six T-bars were coated overall at the following thicknesses.

Plates 5/8":  Mil
P1 .................................................. 1
P2 .................................................. 0.7
P3 .................................................. 0.7
P4 .................................................. 3.0
P5 .................................................. 0.9

Structural T-bars 1/4":
S1 .................................................. 3.0
S2 .................................................. 0.8
S3 .................................................. 0.7
S4 .................................................. 0.7
S5 .................................................. 0.7
S6 .................................................. 2.0

The following pieces were welded the following day:

| Method | Pieces | Speed |
| --- | --- | --- |
| (a) Equip. 1 | S2 to P5 | 30" per min. |
| (b) Equip. 1 | S6 to P1 | 37" per min. |
| (c) Equip. 1 at 400 amps | S1 to P4 | 30" per min. and 35" per min. |
| (d) Equip. 2 | S4 to P3 | 28" per min. |

All tests were fillet welds on both sides. All of the welds were checked visually and found to be satisfactory.

EXAMPLE 10

Example 8 was repeated except that steel sheets which had been coated in accordance with the present invention were welded together. White metal sand blasted steel (1½ mils estimated profile) sheets were coated in the manner outlined in Example 8 and were then welded using (1) a Gilliland Twin 60 Short Arc machine with MIG electrode and a shielding gas made up of 75% argon and 25% carbon dioxide. Alternatively, (2) an Airco Flux Core procedure was employed using an Arc Alloy Rod 78. The 4" x 5' sand blasted plates which had been coated with the coating mixture of Example 1 were coded as follows:

| | Steel | Thickness |
| --- | --- | --- |
| Code: | | |
| P1 | ½" Triten steel | 1¼ mils. |
| P2 | do | 2 mils. |

The following pieces were fillet welded the next day:

| | Method | Pieces |
| --- | --- | --- |
| Test No.: | | |
| (a) | Equip. 1 at 19 v., 140 amps | P1 to P2. |
| (b) | Equip. 1 at 21 v., 150 amps | P1 to P2. |
| (c) | Equip. 2 at 33 v., 325 amps | P1 to P2. |

All of the welds appeared satisfactory except for test (a) and this was corrected by increasing the current flow. The test results secured after arc gouging were:

Test— Results
(a) ............ 7 porosities in 30 linear inches.
(b) ............ 6 porosities in 30 linear inches.
(c) ............ 3 porosities in 30 linear inches.

All porosities were below 1/16" diameter and the welds were all satisfactory.

A wide variety of silicate coatings which are employed with sacrificial metals (as illustrated by zinc dust) may also be employed. These include the following general types:

(1) Alkali silicate coatings which require heat treatment after curing.

(2) Alkali silicate coatings which are cured by chemical treatment after an initial drying stage, such as by a wash of a curing acidic solution, such as phosphoric acid, organic phosphates, etc., with suitable additives to promote film, control reaction, etc.

(3) Self-curing coatings based on alkali silicates pretreated with acids.

(4) Self-curing coatings based on especially high silica to alkali oxide ratio, such as sodium, potassium, lithium and ammonium silicates, and suitable admixtures thereof, which ratios may range from about 3.5 to 1 to 8 to 1 or greater, but preferably above 4 to 1. In general, since the higher the ratio the better the early moisture resistance, high ratios which are obtainable with lithium silicate, for example 10:1, 12:1 and 16:1 or higher, provide certain advantages when either applied alone or as admixtures with other silicates.

(5) Colloidal silicas, for example those prepared from silica sols, colloidal silicates, hydrolyzed alkyl orthosilicates, etc., such as those in the 1–500 millimicron size, depending on the method prepared.

(6) The above formulations contain "pot-life" additives which generally work on the principle of temporarily inactivating the sacrificial metal surface by the use of sulfides, chromates, etc., so that one is allowed a longer time to apply the coating after the sacrificial metal and silicate are mixed.

The following examples illustrate the use of other silicate coatings.

EXAMPLE 11

An alkali silicate-zinc coating mixture containing lithium silicate as the major resin (Rustban 191—Humble Oil and Refining Co.) is applied to clean steel by spraying so that a coating of approximately 0.9–1.0 mil is secured. The steel plates were ½ inch ASTM A–212 torch cut. Two such sheets were welded together using a Linde Submerged Arc Welder operating at 33 volts/550 amp. The welding electrode was Linde 40B wire 5/32 of an inch. The welding was carried out utilizing ½ inch fillets at a speed of 15 inches per minute.

By visual examination the welded joint appeared excellent and no pinholes were found. An X-ray examination of the weld disclosed that it was acceptable under techniques described in UW 51 of Section VIII of ASME Boiler and Pressure Vessel Code.

EXAMPLE 12

Example 11 was repeated but the welding speed was 20 inches per minute. The results secured were comparable. Examination visually showed no pinholes and the welds were acceptable.

EXAMPLE 13

Example 11 was repeated but the steel sheets were coated with Dimetcote D4 (Amercoat Corporation) in which colloidal silica is the major resin. A coating of approximately 1.0 mil thickness was applied to the sheets. The weld appeared slightly rough but visual examination disclosed no pinholes and X-ray examination established the weld was acceptable.

EXAMPLE 14

Example 13 was repeated but a welding speed of 20 inches per minute was employed. The results secured were comparable and the weld was acceptable.

EXAMPLE 15

Example 11 was repeated but the steel was coated with a mixture in which ammonium silicate was the major resin and in which there were 100 parts of zinc to 6–10 parts of $SiO_2$. The coating applied to the steel sheets by spraying was 1.0–1.2 mils in thickness. The weld obtained was free from pinholes and was found by X-ray examination to be acceptable.

EXAMPLE 16

Example 15 was repeated but a welding speed of 20 inches per minute was utilized. The weld secured was free from pinholes and was found acceptable.

EXAMPLE 17

Example 11 was repeated but the steel sheets were coated with a mixture in which sodium silicate, made self-curing as described in application Ser. No. 506,001, filed Nov. 1, 1965, was the major resin and in which the zinc was present in a ratio of 5 to 1 based on the sodium silicate. The coating applied to the sheets was 0.8–1.0 mil in thickness. The base sheet had a coating of 0.8 mil while the vertically arranged sheet had a coating of 1.0 mil. The weld secured was satisfactory, free from pinholes and acceptable.

EXAMPLE 18

Example 17 was repeated but a welding speed of 20 inches per minute was employed. The weld secured was satisfactory, free from pinholes and acceptable.

The following examples illustrate additional examples employing silicate esters:

EXAMPLE 19

Example 11 was repeated but the coating mixture employed was that disclosed in U.S. Patent 3,056,684 altered by replacing a portion of the zinc with powdered aluminum. The proportion of aluminum employed was such that the resulting composition included 7–9 parts of zinc by weight per part of aluminum. A coating of approximately 0.6–0.7 mil was applied to the sheets. After welding, X-ray examination of the weld dislosed that it was acceptable.

EXAMPLE 20

Example 19 was repeated but a welding speed of 20 inches per minute was employed. The results secured were comparable and the weld was acceptable.

EXAMPLE 21

Example 19 was repeated except that a coating of 3.0–4.0 mils was applied to the sheets. The results secured were comparable and the weld was acceptable.

EXAMPLE 22

Example 21 was repeated but a welding speed of 20 inches per minutes was employed. The results secured were comparable and the weld was acceptable.

EXAMPLE 23

Example 11 was repeated but the steel sheets were coated with Dimetcote D6 (Amercoat Corporation) in which an ethyl silicate-type resin is employed. A coating of 0.7 mil thickness was applied to the sheets. X-ray examination established the weld to be acceptable.

EXAMPLE 24

Example 23 was repeated but a welding speed of 20 inches per minute was employed. The results secured were comparable and the weld was acceptable.

EXAMPLE 25

Steel plates ¼″ x 6″ x 48″ were coated with Dimetcote D3 (Amercoat Corporation) to an average thickness of 1–1¼ mils. Two such plates were welded together with a flat bead weld using a Lincolnweld Submerged Arc Automatic welder with Linde 40B 5/32 inch wire, Linde 350 Flux and set up with 425–450 amps at 27 volts. The welding was carried out at a speed of 31 inches a minute. Two other pair of steel plates were welded together with fillet welds also at 31 inches per minute.

The welds were all entirely satisfactory both as to machine performance and appearance.

EXAMPLE 26

Example 25 was repeated but the welding was carried out with a Linde UCC–3 welder instead of the Lincolnweld welder, Linde 40B ⅛″ wire and a speed of 45 inches per minute. Utilizing 450 amps at 28 volts, a flat weld was made which was entirely satisfactory both as to machine performance and appearance. A fillet weld was then made at the same speed but utilizing 600 amps at 28 volts. This weld likewise was entirely satisfactory.

EXAMPLE 27

Example 8 was repeated except that clean blasted steel plates were used and the coating was 0.6 mil on all plates. Two of these plates were fillet welded together utilizing a Hobart Semi-Automatic welder, Model MIG–25B with a carbon dioxide protective gas system. The wire size was 0.035 inch. The welding was carried out at a speed estimated at 20 inches per minute at 175 amps and 23 volts. The volume of carbon dioxide was 35 cubic feet per hour. The weld secured was entirely satisfactory.

EXAMPLE 28

Example 27 was repeated but the welding was carried out with a Linde SWM–SCC9 Automatic utilizing wire 0.35 inch in size. The welding was carried out at a rate of 16–18 inches per minute at 150 amps and 27 volts. The weld secured was entirely satisfactory.

EXAMPLE 29

Example 27 was repeated but the coating applied was 1.0 mil in thickness, the plates were butt welded, and a Hobart MIG Automatic was employed. The welding was carried out at a speed of 30 inches per minute utilizing 150–160 amps at 29 volts. The weld secured was entirely satisfactory.

EXAMPLE 30

Example 29 was repeated but a welding speed of 40 inches per minute was employed. The weld secured was again entirely satisfactory.

The welding rates of the above primed steel examples were substantially the same as the corresponding unprimed steel to yield a welded joint of substantially the same high-quality and strength as though the weldable primer coating were not present.

In addition, the above welded primed steel can be top coated with a permanent protective coating system without removing the prime coat. Stated another way, they have the advantage of being primed without any disadvantages in machine weldability or in subsequent top coating.

The desired thickness of the inorganic-sacrificial metal coating will depend on many variables such as for example the specific formulation employed, the time and severity of corrosion conditions to which the coated metal is exposed, the type and severity of handling and fabricating procedures, etc. For economic reasons it is undesirable to build up a coating beyond that required to fulfill its intended purpose. Furthermore, too thick a coating might impede the welding operation. Examples of suitable thicknesses may range from about 0.1 to 4.0 mils or greater, such as from 0.5 to 3 mils, for example from 1–2.5 mils, but preferably about 1.25 (±0.50) mil, i.e. from 0.75 to 1.75 mils. In general, the coating should be thick enough to prevent corrosion but not too thick so as to substantially interfere with or impede machine weldability, with a minimum thickness, consistent with these objectives, to render the operation as inexpensive as possible.

As is quite evident, other inorganic coatings and sacrificial metals besides those specifically mentioned herein can be employed in this invention. It is, therefore, not only impossible to attempt a comprehensive catalogue of such materials, but to attempt to describe the invention in its broadest aspects in terms of specific components, proportions and procedures would be too voluminous and unnecessary since one skilled in the art could by following the description and spirit of this invention herein select useful inorganic coatings and sacrificial metals. This invention lies in the use of such suitable coatings and metals and their individual composition is important only in the sense that their properties can affect the function as suitable primers having machine weldability. To precisely define each specific useful coating-metal combination in light of the present disclosure would merely call for knowledge within the skill of the art.

The ultimate possible welding rates increase with manual welding, semi-automatic machine welding and automatic machine welding, respectively in the order stated. Thus, in general the fastest ultimate welding rates are obtainable with automatic machine welding, the next fastest with semi-automatic machine welding, and the slowest rate with manual welding.

However, the ultimate welding rate obtainable for each unit welding job will vary considerably within each welding class whether it be manual, semi-automatic, or automatic machine welding. The ultimate welding rate in each of the above classes will vary with the nature of the welding job such as, for example, the thickness of the plate welded, the type of weld joint (i.e. square butt groove welding, horizontal and vertical; single V groove welding, horizontal and vertical, vertical fillet welding; standing fillet welding; circumferential joint welding, etc.); the heat generated by the particular welding apparatus, etc.

Since the essence of the present invention is the ability to weld primed steel at substantially the same rate as the unprimed steel in the corresponding unit operation, the true test of the present invention is to be able to weld both the corresponding primed and the unprimed steel at substantially the same rates in the same unit welding operation to yield a weld of equally acceptable quality. Even where some differential exists between the highest possible welding rate obtainable between the corresponding primed and unprimed steel at extremely high welding rates, one should still be able to employ the high welding rates acceptable at the standard rates of machine welding with steels primed in accord with this invention.

The essence of the present invention is a machine weldable essentially inorganic coating containing a sacrificial metal. The term "essentially inorganic" does not necessarily preclude the presence of certain organic materials in the coating where the essential inorganic nature of the coating as a function of machine weldability is preserved. Thus, where certain additives, polymers, etc. are employed in conjunction with the inorganic coatings in less than major amounts, so that the amount of organic components does not prevent the coated product from being machine weldable, it is included within the scope of this invention.

In view of the above, it will be seen that the several objects of the invention are achieved and other advantageous results attained.

As various changes could be made in the above methods without departing from the scope of the invention, it is intended that all matter contained in the above description shall be interpreted as illustrative and not in a limiting sense.

What is claimed is:

1. The method of arc-welding steel which comprises cleaning the steel, coating the cleaned steel with a weldable primer which comprises a metal binder selected from the group consisting of silicates, titanates, and mixtures thereof and a sacrificial metal sufficient in amount to provide electrical contact throughout the coating and with the steel, the weldable primer coating having a thickness of approximately 0.1 to 4.0 mils, and machine arc-welding the coated steel at substantially the same rate as if the steel were uncoated to form a welded joint.

2. The method of claim 1 where the sacrificial metal is zinc.

3. The method of claim 1 where the inorganic binder is a silicate binder.

4. The method of claim 3 where the sacrificial metal is zinc.

5. The method of claim 3 where the coating is orthosilicate ester derived.

6. The method of claim 4 where the coating is orthosilicate ester derived.

7. The method of claim 4 and further characterized in that the coating has a thickness of approximately 1.25 mils.

8. The method of claim 4 where the coating is water-based silicate derived.

9. The method of claim 4 where the coating is alkali silicate derived.

10. The method of claim 4 where the coating is colloidal silica derived.

References Cited

UNITED STATES PATENTS

| | | | |
|---|---|---|---|
| 2,806,801 | 9/1957 | Leston | 148—22 X |
| 2,898,253 | 8/1959 | Schneider. | |
| 3,056,684 | 10/1962 | Lopata. | |
| 3,287,142 | 11/1966 | Russell. | |

JOSEPH V. TRUHE, Primary Examiner

J. G. SMITH, Assistant Examiner

U.S. Cl. X.R.

117—135.1; 148—22

PO-1050
(5/69)

UNITED STATES PATENT OFFICE
CERTIFICATE OF CORRECTION

Patent No. 3,469,071      Dated September 23, 1969

Inventor(s) Ralph L. Feldt, John F. Montle, and Ernest W. Skiles

It is certified that error appears in the above-identified patent and that said Letters Patent are hereby corrected as shown below:

Column 1, line 6, "Delaware" should read -- Missouri --.

SIGNED AND
SEALED
FEB 17 1970

(SEAL)
Attest:

Edward M. Fletcher, Jr.
Attesting Officer

WILLIAM E. SCHUYLER, JR.
Commissioner of Patents